(12) United States Patent
Sakhnini et al.

(10) Patent No.: US 12,302,350 B2
(45) Date of Patent: May 13, 2025

(54) HYBRID AUTOMATIC REPEAT REQUEST (HARQ) ACKNOWLEDGMENT (ACK) RESOURCE INDICATION FOR MULTI PHYSICAL DOWNLINK SHARED CHANNEL (PDSCH) GRANTS

(71) Applicant: QUALCOMM Incorporated, San Diego, CA (US)

(72) Inventors: Iyab Issam Sakhnini, San Diego, CA (US); Tao Luo, San Diego, CA (US); Konstantinos Dimou, New York City, NY (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/885,173

(22) Filed: Aug. 10, 2022

(65) Prior Publication Data

US 2024/0057095 A1    Feb. 15, 2024

(51) Int. Cl.
| | |
|---|---|
| *H04W 72/12* | (2023.01) |
| *H04L 1/1607* | (2023.01) |
| *H04L 1/1812* | (2023.01) |
| *H04W 72/1268* | (2023.01) |
| *H04W 72/23* | (2023.01) |

(52) U.S. Cl.
CPC ........... *H04W 72/23* (2023.01); *H04L 1/1678* (2013.01); *H04L 1/1812* (2013.01); *H04W 72/1268* (2013.01)

(58) Field of Classification Search
CPC . H04W 72/23; H04W 72/20; H04W 72/1268; H04W 72/0493; H04W 72/0446; H04W 72/126; H04L 1/1678; H04L 1/1812; H04L 5/0053; H04L 1/167; H04L 1/182
See application file for complete search history.

(56) References Cited

U.S. PATENT DOCUMENTS

| | | | |
|---|---|---|---|
| 10,666,334 B2 | 5/2020 | Xiong et al. | |
| 2021/0160879 A1* | 5/2021 | Lin | H04W 72/0453 |
| 2021/0168779 A1* | 6/2021 | Mondal | H04L 5/0035 |
| 2024/0072975 A1* | 2/2024 | Rastegardoost | H04W 72/20 |

* cited by examiner

*Primary Examiner* — Wei Zhao
(74) *Attorney, Agent, or Firm* — Patterson + Sheridan L.L.P.

(57) ABSTRACT

Certain aspects of the present disclosure provide a method for wireless communications by a user equipment (UE). The UE receives downlink control information (DCI) scheduling multiple transmissions belonging to a plurality of sub-groups. Each sub-group includes one or more transmissions. The DCI indicates at least one feedback timing. The UE receives the multiple transmissions belonging to the plurality of sub-groups. The UE transmits feedback for each sub-group of the one or more transmissions, in accordance with the at least one feedback timing.

30 Claims, 15 Drawing Sheets

| Entry | Sub-group 1 | Sub-group 2 | Sub-group 3 | Sub-group 4 |
|---|---|---|---|---|
| 0 | K1(0,1) Resource 1 | K1(0,2) Resource 2 | K1(0,3) Resource 2 | K1(0,4) Resource 1 |
| 1 | K1(1,1) Resource 3 | K1(1,2) Resource 4 | K1(1,3) Resource 3 | K1(1,4) Resource 4 |
| ⋮ | ⋮ | ⋮ | ⋮ | ⋮ |

*FIG. 11*

HYBRID AUTOMATIC REPEAT REQUEST (HARQ) ACKNOWLEDGMENT (ACK) RESOURCE INDICATION FOR MULTI PHYSICAL DOWNLINK SHARED CHANNEL (PDSCH) GRANTS

BACKGROUND

Field of the Disclosure

Aspects of the present disclosure relate to wireless communications, and more particularly, to techniques for transmitting hybrid automatic repeat request (HARQ) feedbacks for different sub-groups of transmissions scheduled via a same downlink control information (DCI).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE), comprising: receiving downlink control information (DCI) scheduling multiple transmissions belonging to a plurality of sub-groups, wherein each sub-group comprises one or more transmissions, and wherein the DCI indicates at least one feedback timing; receiving the multiple transmissions belonging to the plurality of sub-groups; and transmitting feedback for each sub-group of the one or more transmissions, in accordance with the at least one feedback timing.

Another aspect provides a method for wireless communications by a network entity, comprising: transmitting DCI scheduling multiple transmissions belonging to a plurality of sub-groups, wherein each sub-group comprises one or more transmissions, and wherein the DCI indicates at least one feedback timing; transmitting the multiple transmissions belonging to the plurality of sub-groups; and receiving feedback for each sub-group of the one or more transmissions, in accordance with the at least one feedback timing.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 11 depicts example table including HARQ feedback timings and resources for different sub-groups of PDSCHs transmissions.

DETAILED DESCRIPTION

Aspects of the present disclosure provide apparatuses, methods, processing systems, and computer-readable mediums for transmitting feedbacks for different sub-groups of transmissions scheduled via a same downlink control information (DCI).

An extended reality (XR) application may include a virtual reality (VR) application, an augmented reality (AR) application, and/or a mixed reality (MR) application. The XR application generates and consumes in data units, which are larger (e.g., in size) than internet protocol (IP) packets (e.g., data packets). The XR application may use low latency (e.g., a packet delay budget (PDB) of between 5 ms and 25 ms) communications with a highly reliable bit-rate.

In current communication systems, a network entity uses a single DCI to schedule multiple physical downlink shared channel (PDSCH) transmissions to a user equipment (UE), and a single hybrid automatic repeat request (HARQ) feedback is provided by the UE for all the PDSCH transmissions after all the PDSCH transmissions have been decoded. In some cases, when the PDSCH transmissions are related to low-latency XR applications, if a single HARQ feedback (e.g., negative acknowledgement (NACK)) is sent by the UE because of failed decoding of any one of the PDSCH transmissions, but only after all the PDSCH transmissions have been decoded, then timing of retransmission of the PDSCH transmissions may add to significant delays, which may affect the PDB. Accordingly, there is a need to send the HARQ feedbacks more frequently, to prevent delays and meet low-latency requirements of the XR applications.

Techniques proposed herein support HARQ feedbacks for different sub-groups of PDSCH transmissions scheduled via a same DCI. The DCI may indicate HARQ feedback timing (e.g., slot offset between a last PDSCH of a sub-group and a corresponding HARQ feedback occasion) and physical uplink control channel (PUCCH) resource for the HARQ feedback for each sub-group. For example, the PDSCH transmissions may belong to a plurality of sub-groups, and a HARQ feedback is provided after decoding of the PDSCH transmissions within each sub-group in accordance with the HARQ feedback timing and the PUCCH resource. The techniques proposed herein are able to meet the low-latency requirements of the XR applications.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
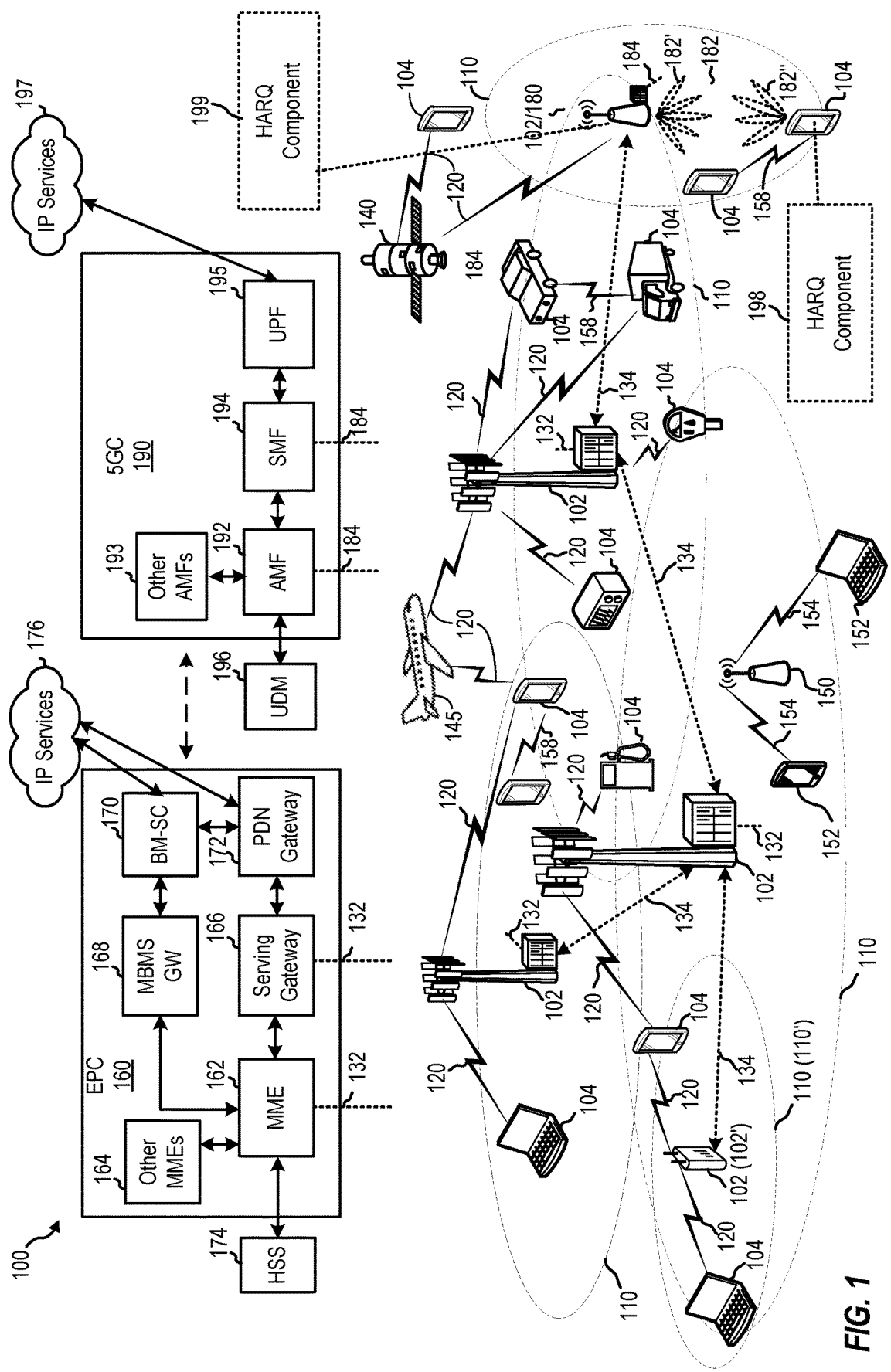
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
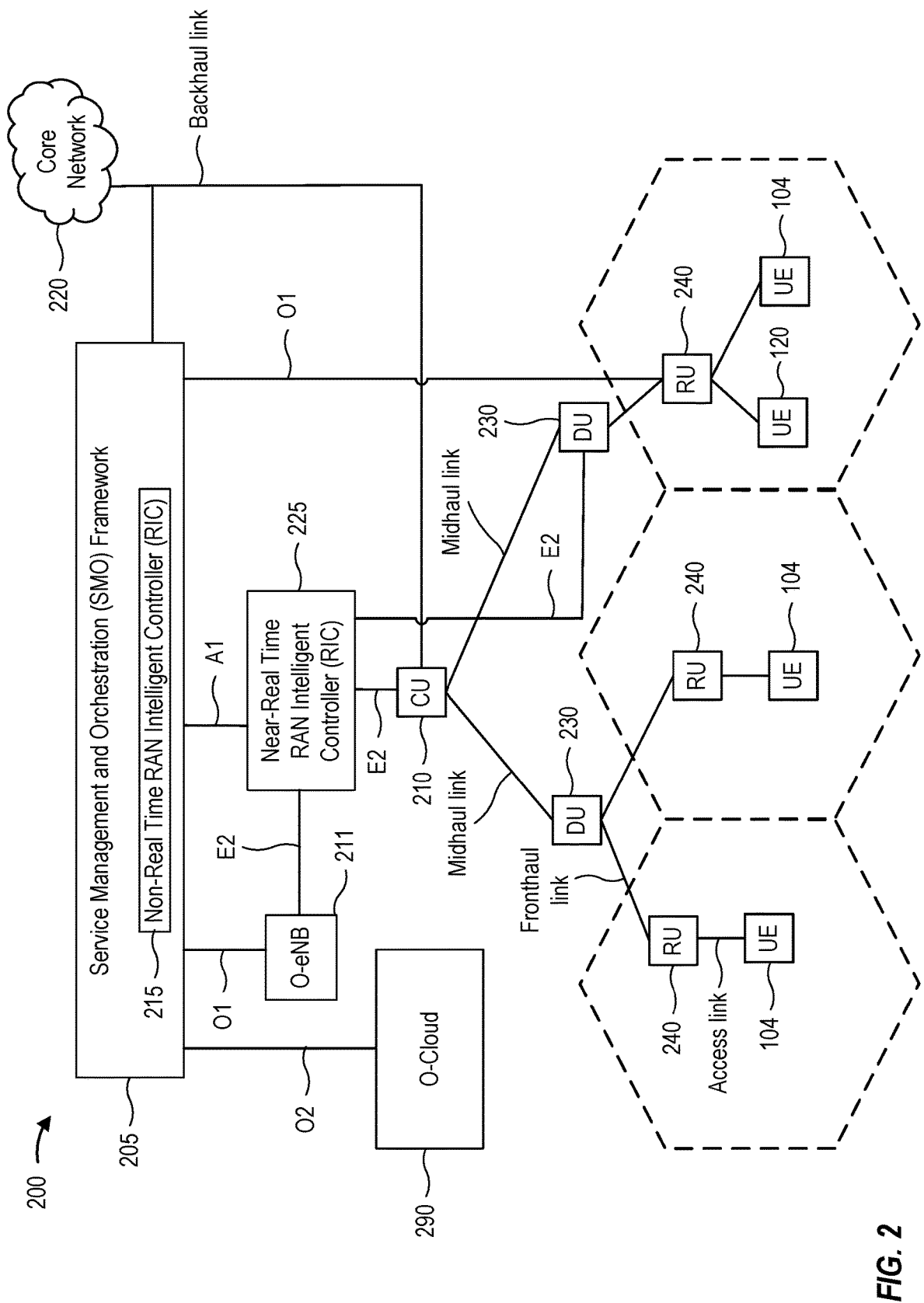
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (MC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 12:
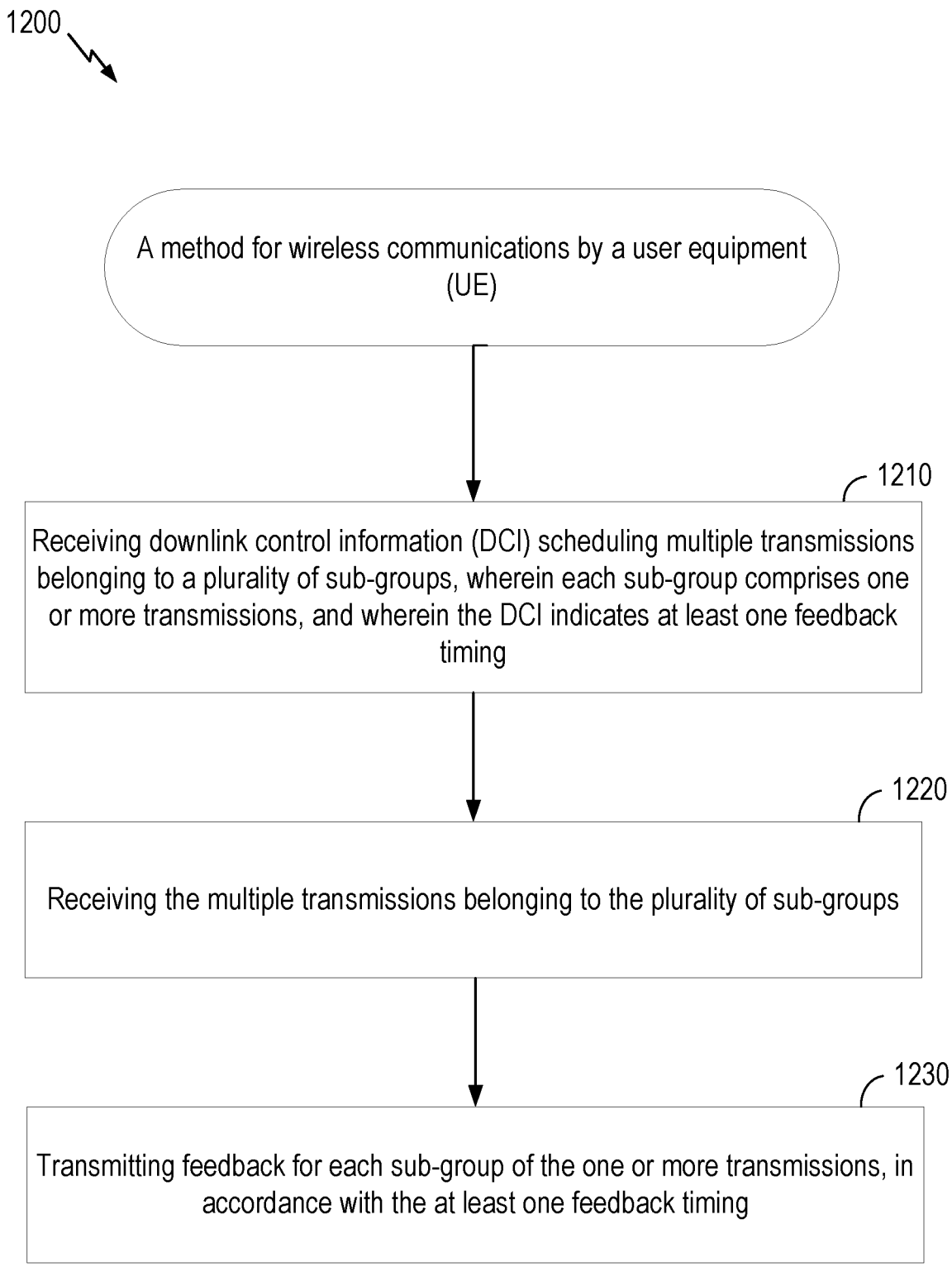
FIG. 12 depicts a method for wireless communications by a UE.

Wireless communication network 100 further includes hybrid automatic repeat request (HARQ) component 198, which may be configured to perform operations 1200 of FIG. 12. Wireless communication network 100 further includes HARQ component 199, which may be configured to perform operations 1300 of FIG. 13.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
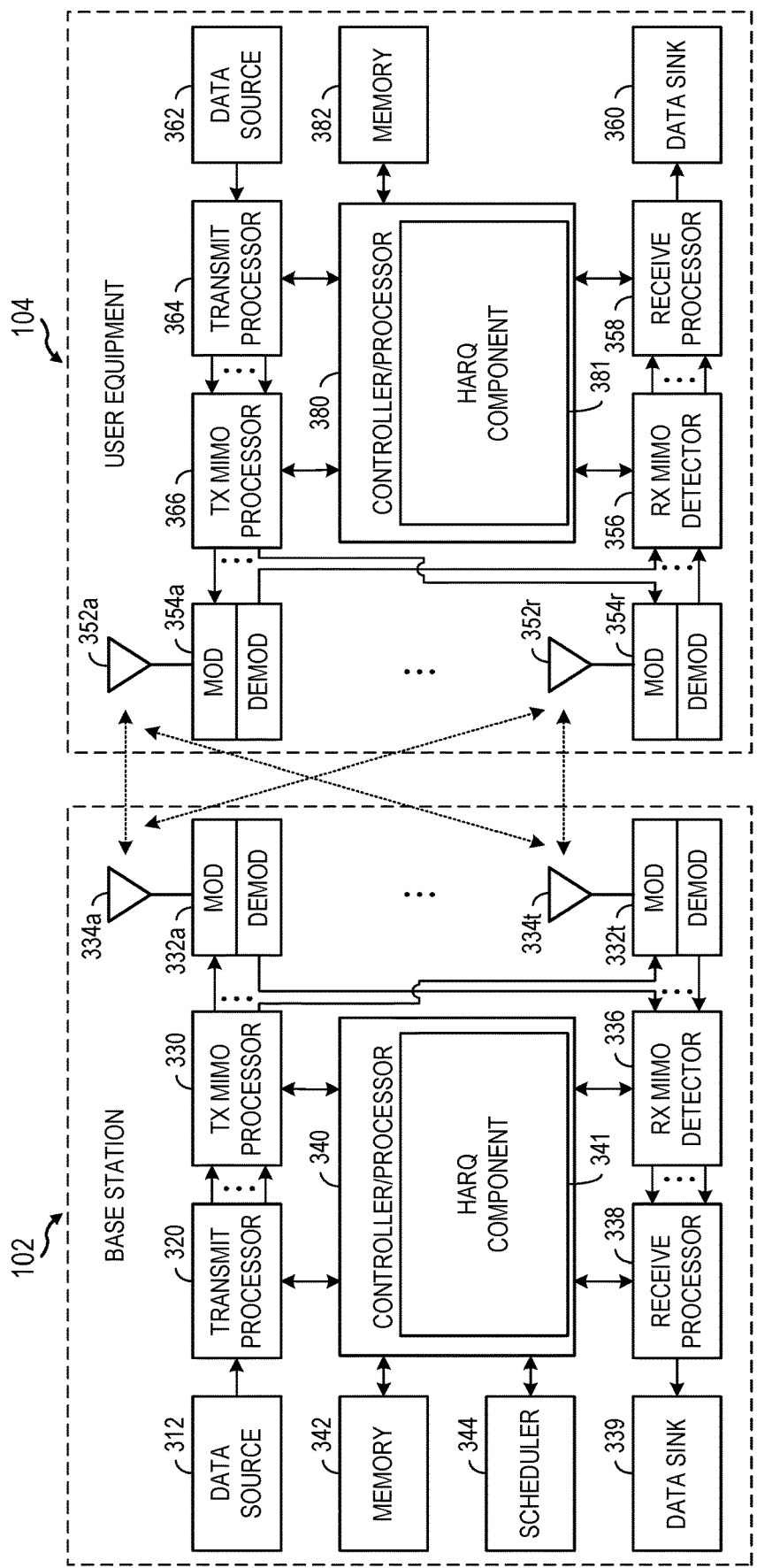
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes HARQ component 341, which may be representative of HARQ component 199 of FIG. 1. Notably, while depicted as an aspect of controller/processor 340, HARQ component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes HARQ component 381, which may be representative of HARQ component 198 of FIG. 1. Notably, while depicted as an aspect of controller/processor 380, HARQ component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
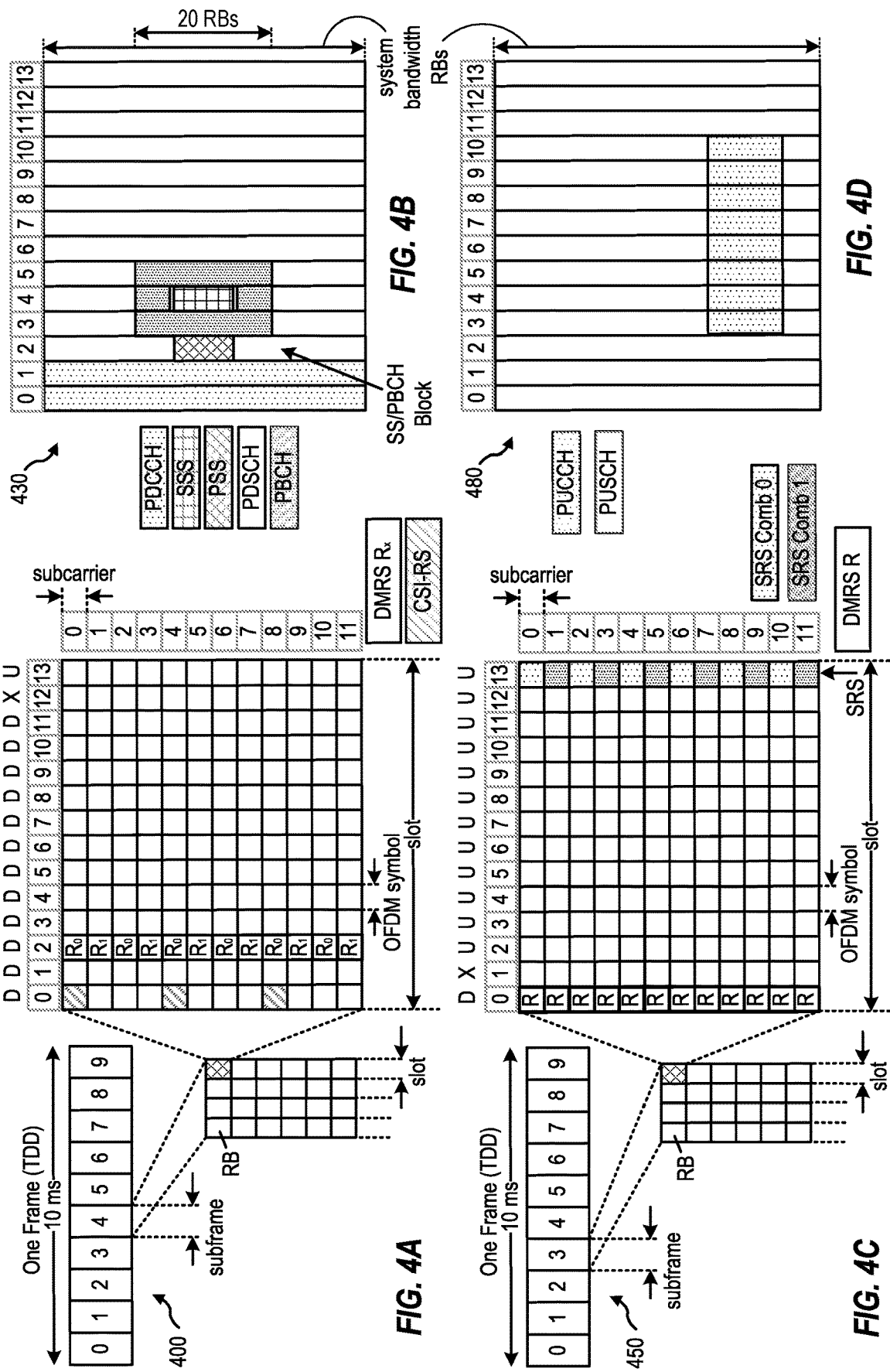
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Quality of Service (QoS)

Quality of service (QoS) refers to a measurement of overall performance of a service experienced by users of a network. To quantitatively measure QoS packet loss, bit rate, throughput, transmission delay, availability, etc. related aspects of the service are considered. QoS includes requirements on all aspects of a connection, such as service response time, loss, signal-to-noise ratio, crosstalk, echo, interrupts, frequency response, and/or loudness levels.

In 5G new radio (NR), QoS is enforced at a QoS flow level. Each QoS flow packets (e.g., data packets) are classified and marked using QoS flow identifier (QFI). For example, a first QoS flow is associated with video packets (e.g., WhatsApp video) and a second QoS flow is associated with video streaming packets (e.g., YouTube video stream).

Within the 5G network, 5G QoS identifier (5QI) mechanism may be used in which packets are classified into different QoS classes. In this way, the QoS can be tailored to specific requirements. Each QoS class has its own assigned QoS characteristics (e.g., such as packet delay and packet loss). Accordingly, some packets can get better QoS than other packets.

Example Extended Reality (XR) Applications

In certain communication systems, extended reality (XR) applications may be integrated and supported. XR may refer to all real-and-virtual combined environments and human-machine interactions generated by computer technology and wearables. XR may also refer to services such augmented reality (AR), virtual reality (VR), cloud gaming, split rendering, split computation, and/or mixed reality (MR).

AR and VR service may be characterized by a human being interacting with environment or people, or controlling a user equipment (UE), and relying on audio-visual feedback. XR may use low latency (e.g., a packet delay budget (PDB) of between 5 ms and 25 ms) communications with a highly reliable bit-rate. Cloud gaming refers to gaming on the UE where at least some of graphical processor unit (GPU) processing is performed on a cloud server where more powerful GPUs may be implemented. Similarly, GPU processing for VR and AR may be split between a GPU on a cloud and a GPU on the UE. However, cloud gaming, split rendering, and split computation services use low latency communications to maintain an acceptable gaming or virtual experience. Cloud gaming may be implemented using quality-of-service (QoS) on a 5G network.

XR data traffic may be periodic, and XR communications may be downlink communications or uplink communications. For downlink XR communications, data rate may be moderate to high, and the downlink XR communications may be subject to latency specifications. For uplink XR communications, the data rate may not be as high as downlink XR communications, but the uplink XR communications may still be subject to latency specifications.

In XR applications, multiple quality of service (QoS) flows are generated for different packets. The multiple QoS flows may be associated with video frame packets, audio/voice packets, control packets (e.g., a user equipment (UE) may send multiple control messages during a car video game), pose update packets (e.g., user head movement in a VR game), and text message packets. The multiple QoS flows may have different QoS requirements (e.g., latency requirements, loss rate requirements, bit rate requirements etc.).

Figure 5:
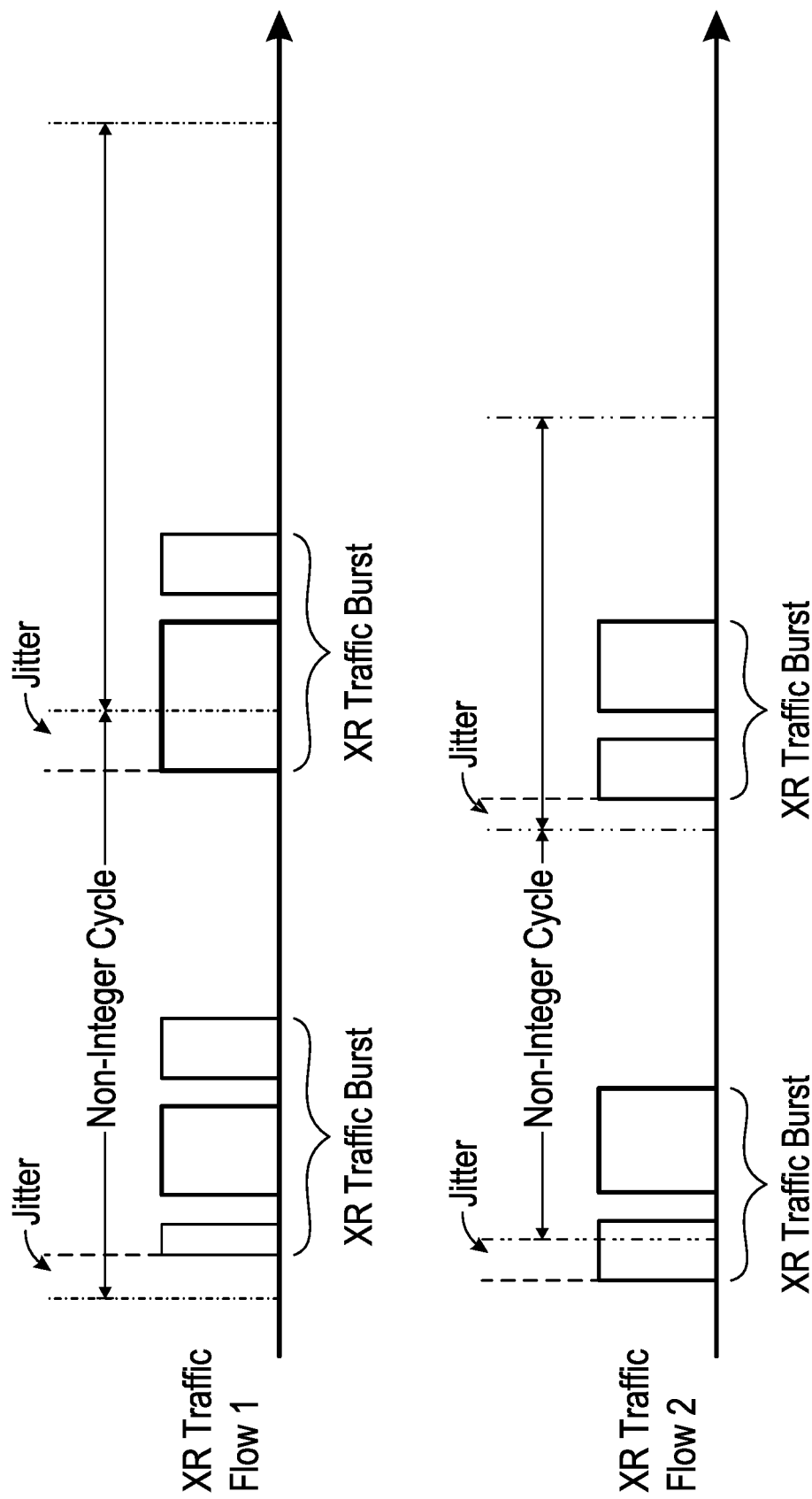
FIG. 5 depicts example extended reality (XR) traffic flows.

In XR applications, a traffic flow may include bursts of files including multiple data packets. Example XR traffic flows are illustrated in FIG. 5. The XR traffic flows may be configured with different configurations. The different characteristics of XR traffic associated with the XR traffic flows may include a packet size, a number of packets, non-integer periods (e.g., 1/60 fps=16.67 ms period and 1/120 fps=8.33 ms period), jitter, and/or a PDB (e.g., which may affect latency specifications). In one example, as illustrated in FIG. 5, the packet size and/or the number of packets per XR traffic burst in a same XR traffic flow or different XR traffic flows may be different. In another example, as illustrated in FIG. 5, arrival times of data packets/XR traffic bursts in the different XR traffic flows may be different and the jitter may be around +/−4 ms.

Example Hybrid Automatic Repeat Request (HARQ) Feedback

In certain communication systems, there is an ongoing effort to reduce latency. For example, in 5G New Radio (NR) systems, there is an ongoing effort to reduce over-the-air latency. The NR system may include communications that are limited in time. As a result, some types of communications include feedback signaling.

One form of feedback is hybrid automatic repeat request (HARQ) feedback. HARQ feedback may be provided by a receiver device (e.g., a user equipment (UE)) to a transmitter device (e.g., a network entity), and may include transmission of several reporting signals to the transmitter device. Example reporting signals may include acknowledgement (ACK) signals representing an ACK state, and negative acknowledgement (NACK) signals representing a NACK state. An ACK signal may be transmitted as part of the HARQ feedback, in response to successful reception and decoding of a data transmission. A NACK signal may be transmitted as part of the HARQ feedback, in response to a reception of a data transmission but an unsuccessful decoding of the data transmission.

In some cases, the HARQ feedback may also indicate that the receiver device is in a discontinuous transmission (DTX) state. The DTX state may indicate that the receiver device has not received a data transmission.

Example HARQ Feedback for Multiple Transmissions

In current communication systems, a network entity uses a single downlink control information (DCI) to schedule multiple physical downlink shared channel (PDSCH) transmissions, and a single hybrid automatic repeat request (HARQ) feedback is provided for all the PDSCH transmissions after all the PDSCH transmissions are decoded.

Figure 6:
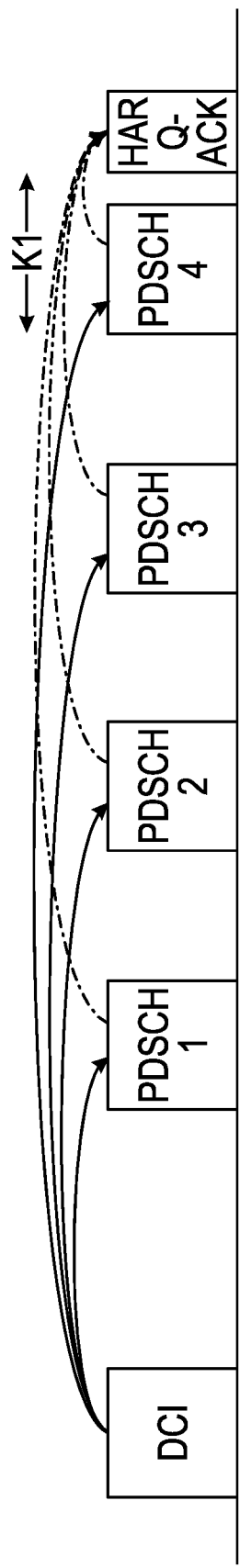
FIG. 6 depicts example downlink control information (DCI) scheduling multiple physical downlink shared channel (PDSCH) transmissions and a single hybrid automatic repeat request (HARQ) feedback for all the PDSCHs transmissions.

For example, as illustrated in FIG. 6, a network entity transmits a single DCI scheduling four PDSCH transmissions (e.g., which are related to extended reality (XR) applications) to a user equipment (UE). The UE receives the four PDSCH transmissions from the network entity. The UE then decodes the four PDSCH transmissions. The UE sends a single HARQ acknowledgement (ACK) feedback for all the four PDSCH transmissions, after the last and fourth PDSCH transmission, when all the four PDSCH transmissions are successfully decoded. K1 indicates a slot offset between the fourth PDSCH transmission scheduled by the DCI and the HARQ-ACK feedback. However, when any one of the four PDSCH transmissions (e.g., a second PDSCH transmission) is not successfully decoded by the UE, the UE sends a single HARQ negative acknowledgement (NACK) feedback after the last and fourth PDSCH transmission. The network entity, upon receiving the NACK feedback, retransmits at least the failed PDSCH transmissions.

As noted above, the XR applications are associated with low latency (e.g., a packet delay budget (PDB) of between 5 ms and 25 ms) communications with a highly reliable bit-rate. For such applications, if a single HARQ feedback (e.g., NACK) is sent because of the failed decoding of anyone of the PDSCH transmissions, but only after all the PDSCH transmissions have been decoded, then the timing of the retransmission of the failed PDSCH transmissions may add to significant delays, which may affect the PDB. Accordingly, there is a need to send the HARQ feedbacks more frequently.

In some cases, the DCI scheduling the multiple PDSCH transmissions may also indicate physical uplink control channel (PUCCH) resources for the HARQ feedback. In some cases, transmitting more that one PUCCH HARQ-ACK may increase the DCI overhead.

In 5G new radio (NR), the PUCCH resources that carry the HARQ-ACK feedback are dynamically controlled by the network entity and can be divided into two parts. A first part may include HARQ feedback timing (K1), which indicates time relationship between the PDSCH transmissions and the corresponding HARQ feedback. For example, when radio resource control (RRC) signaling may be used to configure up to eight offsets (e.g., in terms of slots), then the DCI indicates which one to use using an up to three bit field.

A second part may include a PUCCH resource selection. For example, RRC signaling may be used to configure up to four PUCCH resource sets, PUCCH resources per PUCCH resource set, and a maximum payload size per PUCCH resource set. The UE selects a PUCCH resource set depending on the payload size. Once the PUCCH resource set is selected, if the number of PUCCH resources in the selected PUCCH resource set are less than or equal to eight, a PUCCH resource within the selected PUCCH resource set for the HARQ feedback is indicated using the DCI (e.g., using an up to three bit field). However, if the number of PUCCH resources in the selected PUCCH resource set are more than eight, the PUCCH resource within the selected PUCCH resource set for the HARQ feedback is indicated using an equation that is a function of: DCI field (up to three bits), a number of control channel elements (CCEs) in a control resource set (CORESET), and an index of a first CCE for the DCI reception.

Aspects Related to HARQ-ACK Resource Indication for Multi-PDSCH Grants

Aspects of the present disclosure provide apparatuses, methods, processing systems, and computer-readable mediums for transmitting feedbacks for different sub-groups of transmissions scheduled via a same downlink control information (DCI).

For example, techniques proposed herein support hybrid automatic repeat request (HARQ) feedbacks for different sub-groups of physical downlink shared channel (PDSCH) transmissions (e.g., associated with extended reality (XR) applications) scheduled via a same DCI. The DCI may indicate HARQ feedback timing (e.g., slot offset between a last PDSCH of a sub-group and a corresponding HARQ feedback occasion) and physical uplink control channel (PUCCH) resource for the HARQ feedback for each sub-group. For example, the PDSCH transmissions may belong to a plurality of sub-groups, and a HARQ feedback is provided after decoding of the PDSCH transmissions within each sub-group in accordance with the HARQ feedback timing and the PUCCH resource. The techniques proposed herein are able to meet low-latency requirements of the XR applications.

The techniques proposed herein may be understood with reference to the FIGS. 7-13.

Figure 7:
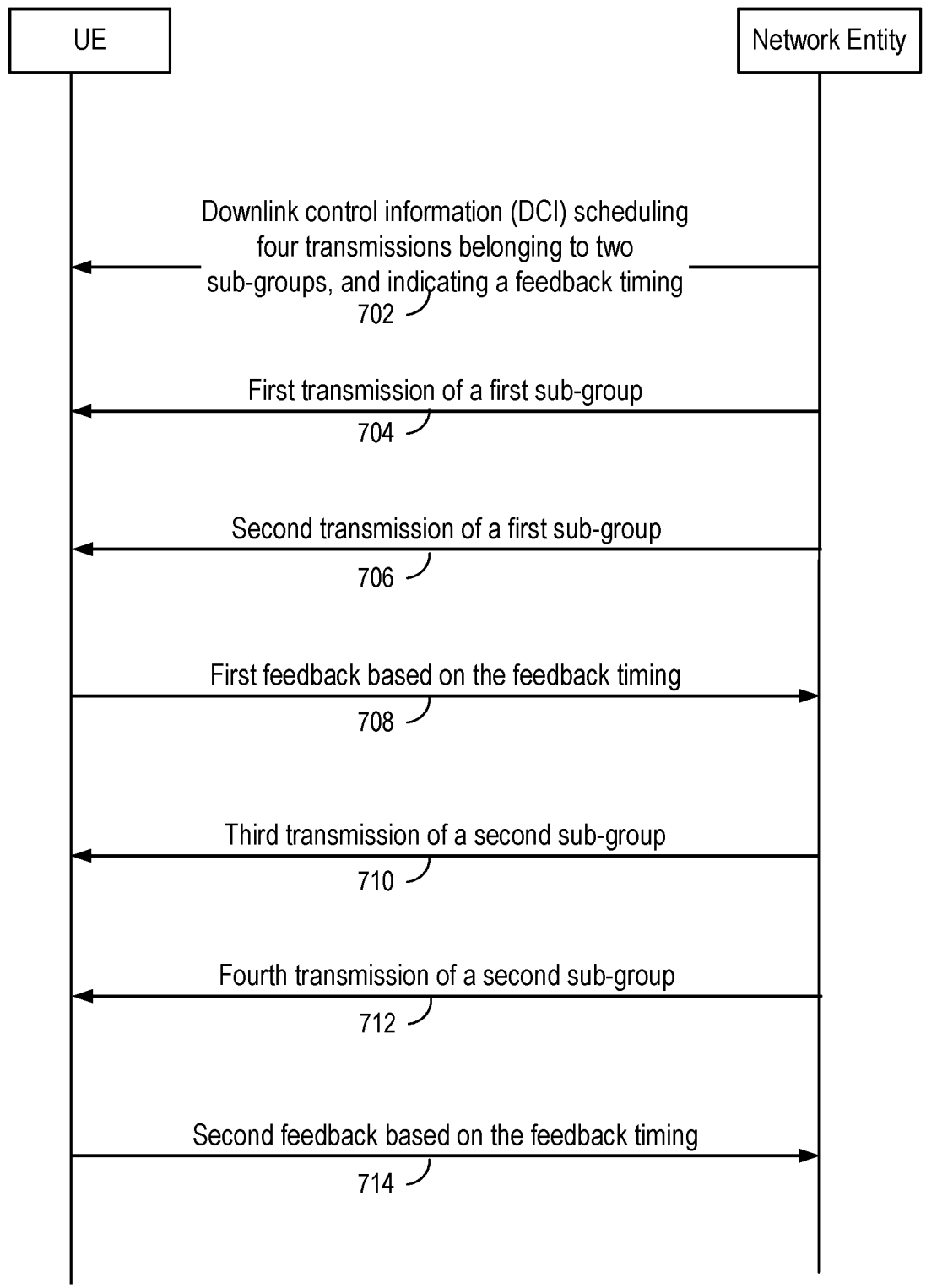
FIG. 7 depicts a call flow diagram illustrating example communication between a UE and a network entity.
Figure 8:
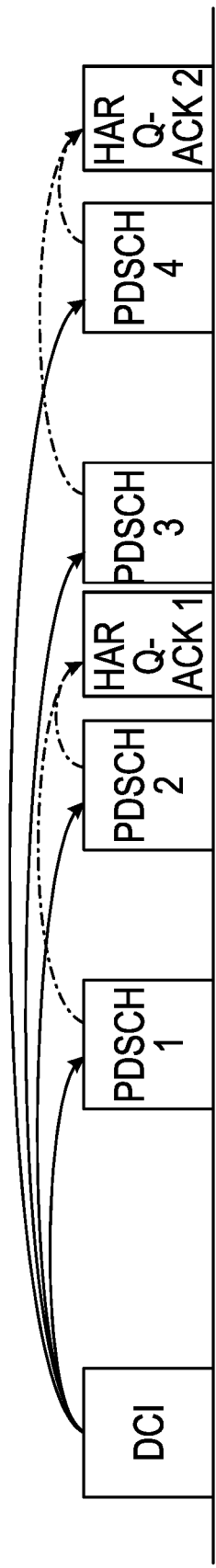
FIG. 8 depicts example DCI scheduling multiple PDSCH transmissions and different HARQ feedbacks for different sub-groups of the PDSCHs transmissions.

As illustrated in FIG. 7, at 702, a network entity (e.g., such as gNodeB (gNB) or BS 102 in wireless communication network 100 of FIG. 1) transmits a DCI to a UE (e.g., such as UE 104 in wireless communication network 100 of FIG. 1).

Figure 9:
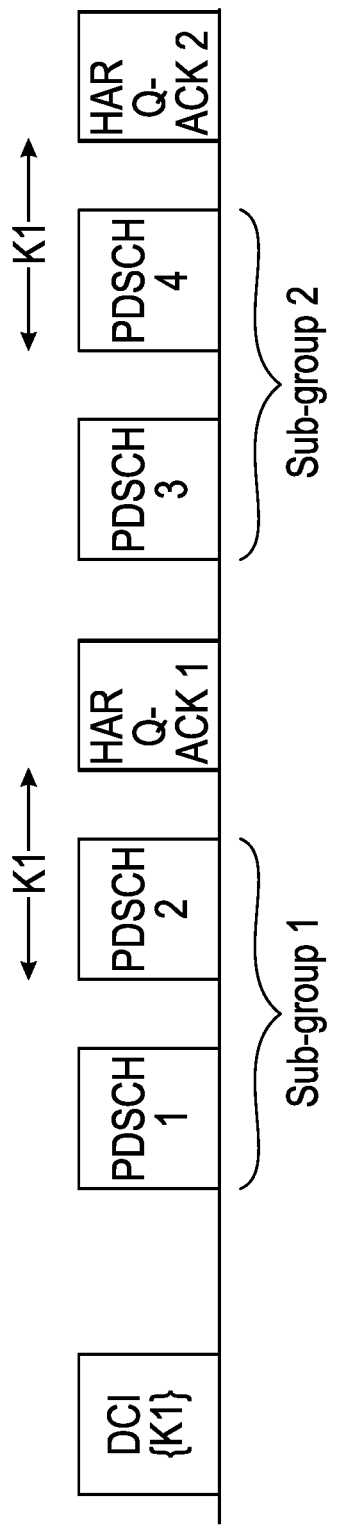
FIG. 9 depicts example sub-groups of PDSCHs transmissions.

In certain aspects, the DCI schedules multiple transmissions (e.g., multiple PDSCH transmissions illustrated in FIG. 8) belonging to a plurality of sub-groups. As illustrated in FIG. 9, the plurality of sub-groups may include a first sub-group and a second sub-group. Each sub-group is associated with one or more transmissions. For example, the first sub-group is associated with a first transmission (e.g., PDSCH 1) and a second transmission (e.g., PDSCH 2). The second sub-group is associated with a third transmission (e.g., PDSCH 3) and a fourth transmission (e.g., PDSCH 4).

In certain aspects, the DCI (or another downlink transmission) indicates one or more parameters. The one or more parameters may include a feedback timing (e.g., a HARQ feedback timing such as K1) and/or a resource (e.g., a PUCCH resource) for a feedback (e.g., a HARQ feedback) for each sub-group. The feedback timing indicates a slot offset between a transmission of a sub-group and a corresponding feedback occasion for the feedback. For example, the slot offset may be between a last PDSCH transmission of the sub-group and the corresponding HARQ feedback.

Referring back to FIG. 7, at 704, the network entity transmits the first transmission of the first sub-group to the UE.

At 706, the network entity transmits the second transmission of the first sub-group to the UE.

At 708, the UE transmits a first feedback (e.g., HARQ ACK 1 illustrated in FIG. 8 and FIG. 9) for the first sub-group to the network entity, in accordance with the feedback timing, upon the successful decoding of the first transmission and the second transmission.

At 710, the network entity transmits the third transmission of the second sub-group to the UE.

At 712, the network entity transmits the fourth transmission of the second sub-group to the UE.

At 714, the UE transmits a second feedback (e.g., HARQ ACK 2 illustrated in FIG. 8 and FIG. 9) for the second sub-group to the network entity, in accordance with the feedback timing, upon the successful decoding of the third transmission and the fourth transmission.

In certain aspects, the HARQ feedback timing and/or the PUCCH resource are applied to all of the plurality of sub-groups. For example, as illustrated in FIG. 9, a single parameter (e.g., K1 HARQ feedback timing) indicated in the DCI is applied for all PDSCH sub-groups and/or component carriers (CCs) and/or code block groups (CBGs).

Figure 10:
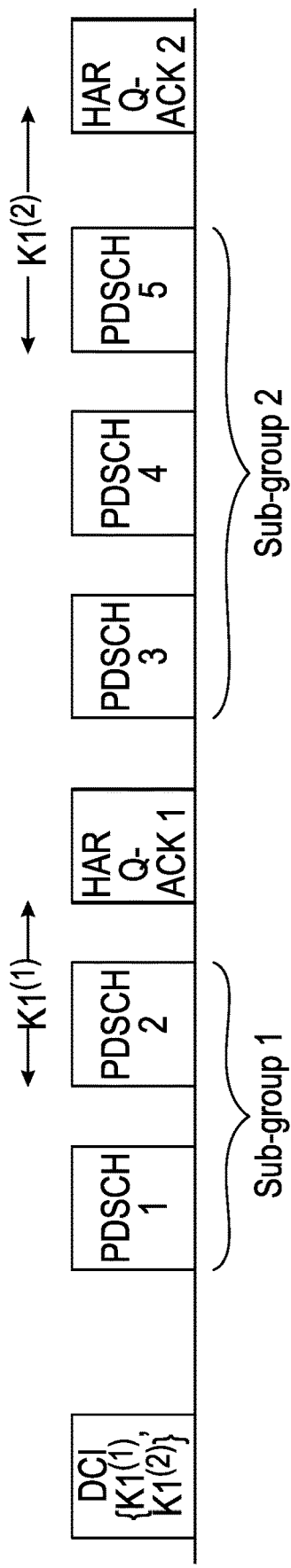
FIG. 10 depicts example HARQ feedbacks for different sub-groups of PDSCHs transmissions

In certain aspects, the DCI may indicate different HARQ feedback timings and/or PUCCH resources. The different HARQ feedback timings and/or the PUCCH resources are applied to different sub-groups of the plurality of sub-groups. For example, as illustrated in FIG. 10, multiple parameters (e.g., K11 and K22 HARQ feedback timings)

indicated in the DCI are applied to different PDSCH subgroups and/or CCs and/or CBGs. In some cases, the multiple parameters in the DCI may increase overhead.

In certain aspects, the DCI may indicate an entry in a table (e.g., table illustrated in FIG. 11) including both HARQ feedback timings and PUCCH resources for different subgroups of the plurality of sub-groups. The table may be configured via a radio resource control (RRC) configuration, and each entry in the table may contain different parameter combination for the multiple sub-groups and/or CCs and/or CBGs.

In certain aspects, when the entry has a first value, a first set of HARQ feedback timings and PUCCH resources are applicable for the different sub-groups. For example, as illustrated in FIG. 11, when the entry is 0, K1 (0,1) HARQ feedback timing and PUCCH resource 1 is applicable for a first sub-group, K1 (0,2) and PUCCH resource 2 is applicable for a second sub-group, K1 (0,3) and PUCCH resource 2 is applicable for a third sub-group, and K1 (0,4) and PUCCH resource 1 is applicable for a fourth sub-group.

In certain aspects, when the entry has a second value, a second set of HARQ feedback timings and PUCCH resources are applicable for the different sub-groups. For example, as illustrated in FIG. 11, when the entry is 1, K1 (1,1) and PUCCH resource 3 is applicable for a first sub-group, K1 (1,2) and PUCCH resource 4 is applicable for a second sub-group, K1 (1,3) and PUCCH resource 3 is applicable for a third sub-group, and K1 (1,4) and PUCCH resource 4 is applicable for a fourth sub-group.

In certain aspects, the DCI indicates an entry in a first table including only HARQ feedback timings for different sub-groups of the plurality of sub-groups. In certain aspects, the DCI indicates an entry in a second table including only PUCCH resources for the different sub-groups of the plurality of sub-groups.

In certain aspects, the DCI indicates an over-riding value and/or a delta value (e.g., of HARQ feedback timings and/or PUCCH resources) for one or more sub-groups within the table.

In certain aspects, the UE receives a configuration configuring a rule from the network entity. The configuration may be the RRC configuration. The rule indicates a number of bits in a HARQ feedback and/or a number of one or more PDSCH transmissions in each sub-group. The UE determines the HARQ feedback timing and/or the PUCCH resource based on the rule.

In one example, a nominal value can be used in the DCI and then delta values (e.g., of HARQ feedback timings and/or PUCCH resources) can be based on the rule. In another example, actual values (e.g., of HARQ feedback timings and/or PUCCH resources) may be derived based on the rule. The values may be based on a number of bits (e.g., a payload size) in the HARQ-ACK feedback and/or a number of PDSCH transmissions in the sub-group.

In certain aspects, the UE selects a PUCCH resource set for the HARQ feedback for each sub-group of the PDSCH transmissions based on a number of bits in the HARQ feedback. For example, the PUCCH resource set is selected based on the payload size of the sub-group HARQ-ACK and/or CCs and/or CBGs.

In certain aspects, when a number of PUCCH resources within the PUCCH resource set are more than a threshold, the UE receives an indication of at least one PUCCH resource within the PUCCH resource set for the HARQ feedback using an equation. The equation is a function of a DCI field within the DCI, a number of control channel elements (CCEs) in a control resource set (CORESET), an index of a first CCE for a reception of the DCI, an index of a sub-group of the plurality of sub-groups, a number of the PDSCH transmissions in the sub-group, and/or the HARQ feedback timing.

In certain aspects, the UE receives a configuration to transmit one HARQ feedback: per DCI or per sub-group of the plurality of sub-groups associated with a same DCI. For example, the network entity may configure the UE to transmit one HARQ-ACK feedback per DCI or use one of above noted options for sending HARQ feedbacks. In some cases, the amount of the multiple PDSCH transmissions is such that no significant transmission delay may be there.

In certain aspects, when a number of the PDSCH transmissions scheduled by the DCI are less than a threshold, the one HARQ feedback per DCI is applicable. In certain aspects, when the number of the PDSCH transmissions are more than the threshold, the one HARQ feedback per sub-group of the plurality of sub-groups is applicable.

In certain aspects, the UE receives a configuration from the network entity to transmit the HARQ feedback for the first sub-group of the PDSCH transmissions after a start of transmission of the second sub-group of the PDSCH transmissions. For example, the transmission of the HARQ feedback of a given PDSCH sub-group may be after the start of PDSCH transmissions of a consequent PDSCH sub-group.

FIG. 12 illustrates example operations 1200 for wireless communication. The operations 1200 may be performed, for example, by a UE (e.g., such as UE 104 in wireless communication network 100 of FIG. 1). The operations 1200 may be implemented as software components that are executed and run on one or more processors (e.g., controller/processor 380 of FIG. 3). Further, transmission and reception of signals by the UE in the operations 1200 may be enabled, for example, by one or more antennas (e.g., antennas 352 of FIG. 3). In certain aspects, the transmission and/or reception of signals by the UE may be implemented via a bus interface of one or more processors (e.g., the controller/processor 380) obtaining and/or outputting signals.

The operations 1200 begin, at 1210, by receiving DCI scheduling multiple transmissions belonging to a plurality of sub-groups. Each sub-group includes one or more transmissions. The DCI indicates at least one feedback timing. For example, the UE may receive the DCI scheduling the multiple transmissions belonging to the plurality of sub-groups, using antenna(s) and/or receiver/transceiver components of UE 104 shown in FIG. 1 or FIG. 3 and/or of the apparatus shown in FIG. 14.

At 1220, the UE receives the multiple transmissions belonging to the plurality of sub-groups. For example, the UE may receive the multiple transmissions belonging to the plurality of sub-groups, using antenna(s) and/or receiver/transceiver components of UE 104 shown in FIG. 1 or FIG. 3 and/or of the apparatus shown in FIG. 14.

At 1230, the UE transmits feedback for each sub-group of the one or more transmissions, in accordance with the at least one feedback timing. For example, the UE may transmit the feedback for each sub-group of the one or more transmissions, using antenna(s) and/or transmitter/transceiver components of UE 104 shown in FIG. 1 or FIG. 3 and/or of the apparatus shown in FIG. 14.

In certain aspects, the multiple transmissions correspond to multiple PDSCH transmissions. The at least one feedback timing corresponds to at least one HARQ feedback timing. The feedback corresponds to a HARQ feedback.

Note that FIG. 12 is just one example of a method, and other methods including fewer, additional, or alternative steps are possible consistent with this disclosure.

Figure 13:
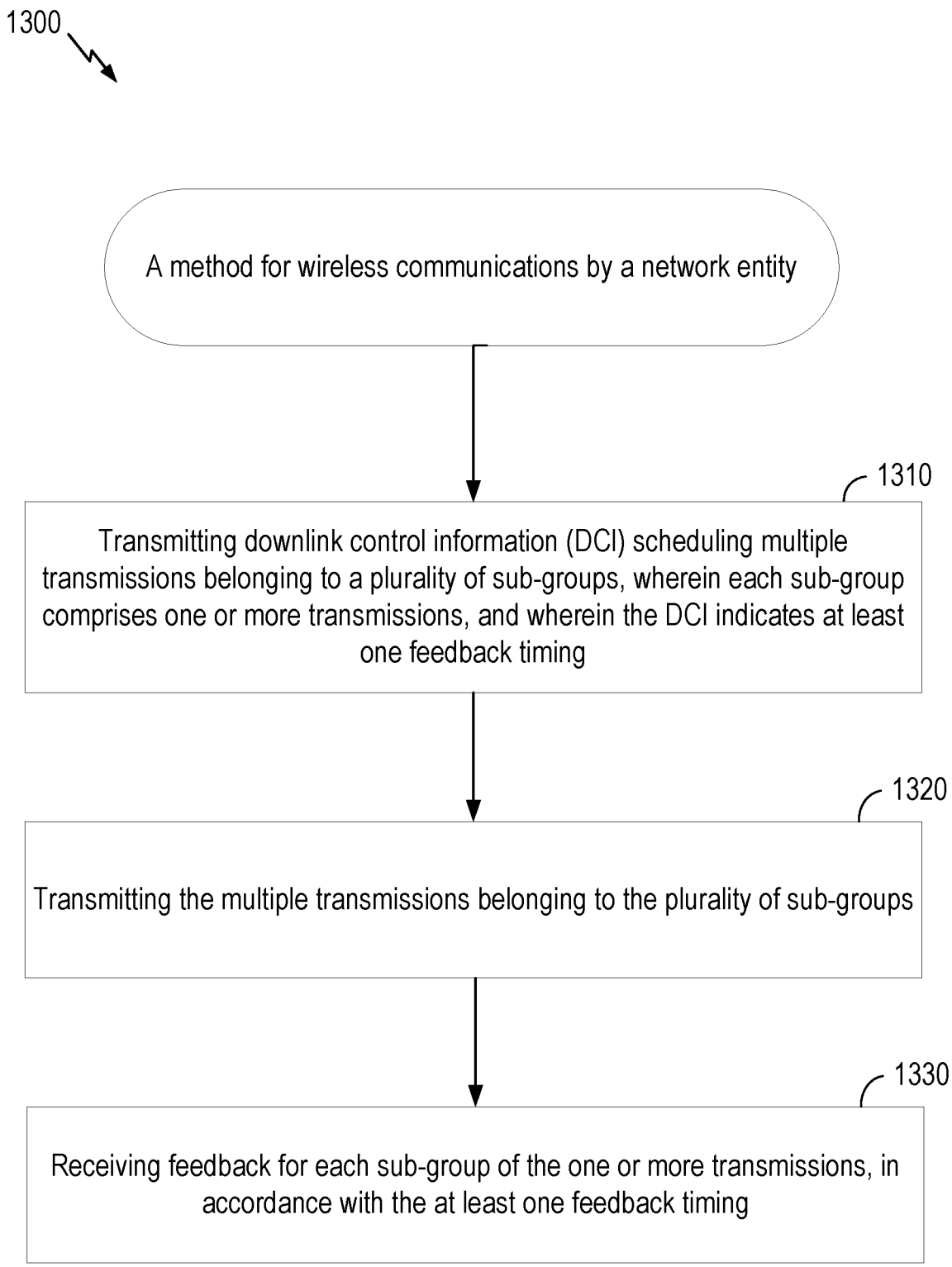
FIG. 13 depicts a method for wireless communications by a network entity.

FIG. 13 illustrates example operations 1300 for wireless communication. The operations 1300 may be performed, for example, by a network entity (e.g., such as BS 102 in wireless communication network 100 of FIG. 1). The operations 1300 may be implemented as software components that are executed and run on one or more processors (e.g., controller/processor 340 of FIG. 3). Further, transmission and reception of signals by the network entity in the operations 1300 may be enabled, for example, by one or more antennas (e.g., antennas 334 of FIG. 3). In certain aspects, the transmission and/or reception of signals by the network entity may be implemented via a bus interface of one or more processors (e.g., the controller/processor 340) obtaining and/or outputting signals.

The operations 1300 begin, at 1310, by transmitting DCI scheduling multiple transmissions belonging to a plurality of sub-groups. Each sub-group includes one or more transmissions. The DCI indicates at least one feedback timing. For example, the network entity may transmit the DCI scheduling the multiple transmissions belonging to the plurality of sub-groups, using antenna(s) and/or transmitter/transceiver components of BS 102 shown in FIG. 1 or FIG. 3 and/or of the apparatus shown in FIG. 15.

At 1320, the network entity transmits the multiple transmissions belonging to the plurality of sub-groups. For example, the network entity may transmit the multiple transmissions belonging to the plurality of sub-groups, using antenna(s) and/or transmitter/transceiver components of BS 102 shown in FIG. 1 or FIG. 3 and/or of the apparatus shown in FIG. 15.

At 1330, the network entity receives feedback for each sub-group of the one or more transmissions, in accordance with the at least one feedback timing. For example, the network entity may receive the feedback for each sub-group of the one or more transmissions, using antenna(s) and/or receiver/transceiver components of BS 102 shown in FIG. 1 or FIG. 3 and/or of the apparatus shown in FIG. 15.

In certain aspects, the multiple transmissions correspond to multiple PDSCH transmissions. The at least one feedback timing corresponds to at least one HARQ feedback timing. The feedback corresponds to a HARQ feedback.

Note that FIG. 13 is just one example of a method, and other methods including fewer, additional, or alternative steps are possible consistent with this disclosure.

Example Communications Devices

Figure 14:
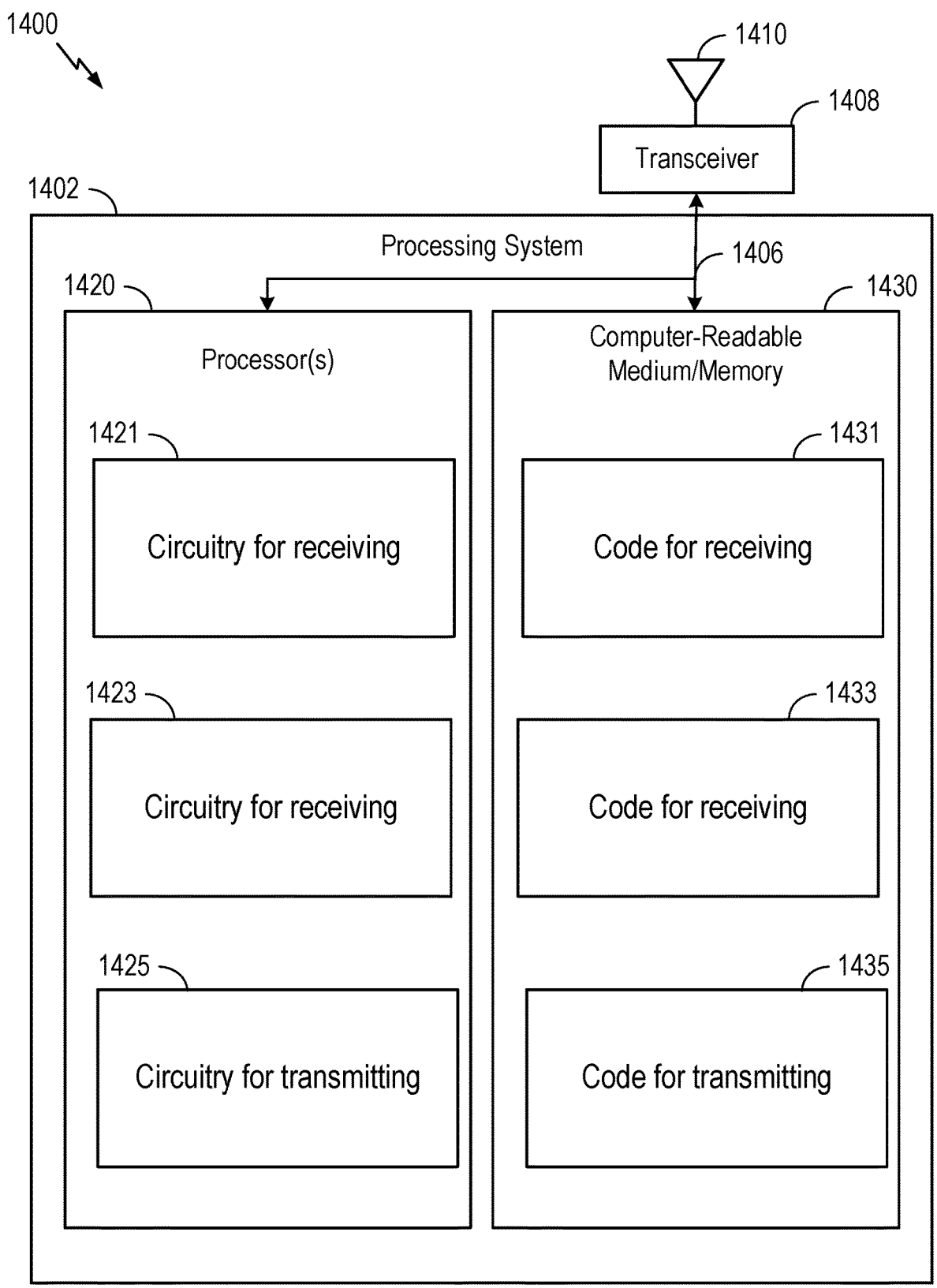
FIGS. 14-15 depict aspects of example communications devices.

FIG. 14 depicts aspects of an example communications device 1400. In some aspects, communications device 1400 is a UE, such as UE 104 described above with respect to FIGS. 1 and 3.

The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes one or more processors 1420. In various aspects, the one or more processors 1420 may be representative of one or more of receive processor 358, transmit processor 364, TX MIMO processor 366, and/or controller/processor 380, as described with respect to FIG. 3. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the operations 1200 described with respect to FIG. 12, or any aspect related to it. Note that reference to a processor performing a function of communications device 1400 may include one or more processors performing that function of communications device 1400.

In the depicted example, computer-readable medium/memory 1430 stores code (e.g., executable instructions) for receiving 1431 comprising code for receiving DCI scheduling multiple transmissions belonging to a plurality of sub-groups where each sub-group comprises one or more transmissions and where the DCI indicates at least one feedback timing, code for receiving 1433 comprising code for receiving the multiple transmissions belonging to the plurality of sub-groups, and code for transmitting 1435 comprising code for transmitting feedback for each sub-group of the one or more transmissions, in accordance with the at least one feedback timing. Processing of the code 1431-1435 may cause the communications device 1400 to perform the operations 1200 described with respect to FIG. 12, or any aspect related to it.

The one or more processors 1420 include circuitry configured to implement (e.g., execute) the code stored in the computer-readable medium/memory 1430, including circuitry for receiving 1421 comprising circuitry for receiving DCI scheduling multiple transmissions belonging to a plurality of sub-groups where each sub-group comprises one or more transmissions and where the DCI indicates at least one feedback timing, circuitry for receiving 1423 comprising circuitry for receiving the multiple transmissions belonging to the plurality of sub-groups, and circuitry for transmitting 1425 comprising circuitry for transmitting feedback for each sub-group of the one or more transmissions, in accordance with the at least one feedback timing. Processing with circuitry 1421-1425 may cause the communications device 1400 to perform the operations 1200 described with respect to FIG. 12, or any aspect related to it.

Various components of the communications device 1400 may provide means for performing the operations 1200 described with respect to FIG. 12, or any aspect related to it. For example, means for transmitting, sending or outputting for transmission may include the transceivers 354 and/or antenna(s) 352 of the UE 104 illustrated in FIG. 3 and/or transceiver 1408 and antenna 1410 of the communications device 1400 in FIG. 14. Means for receiving or obtaining may include the transceivers 354 and/or antenna(s) 352 of the UE 104 illustrated in FIG. 3 and/or transceiver 1408 and antenna 1410 of the communications device 1400 in FIG. 14.

Figure 15:
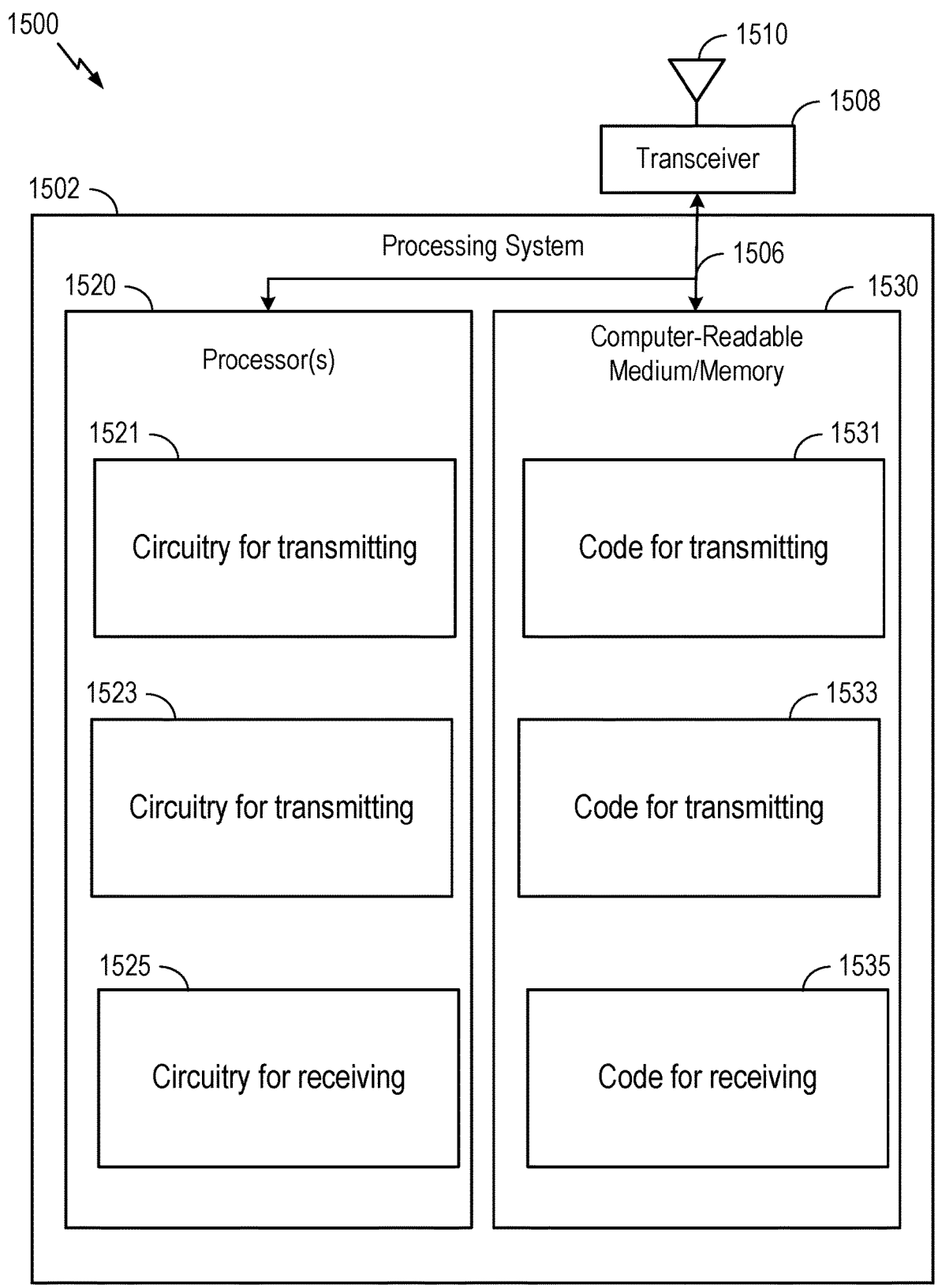

FIG. 15 depicts aspects of an example communications device 1500. In some aspects, communications device 1500 is a network entity, such as BS 102 described above with respect to FIGS. 1 and 3.

The communications device 1500 includes a processing system 1502 coupled to a transceiver 1508 (e.g., a transmitter and/or a receiver) and/or a network interface. The transceiver 1508 is configured to transmit and receive signals for the communications device 1500 via an antenna 1510, such as the various signals as described herein. The network interface 1512 is configured to obtain and send signals for the communications device 1500 via communications link (s), such as a backhaul link, midhaul link, and/or fronthaul link as described herein, such as with respect to FIG. 2. The processing system 1502 may be configured to perform processing functions for the communications device 1500, including processing signals received and/or to be transmitted by the communications device 1500.

The processing system 1502 includes one or more processors 1520. In various aspects, one or more processors 1520 may be representative of one or more of receive processor 338, transmit processor 320, TX MIMO processor 330, and/or controller/processor 340, as described with respect to FIG. 3. The one or more processors 1520 are coupled to a computer-readable medium/memory 1530 via a bus 1506. In certain aspects, the computer-readable medium/memory 1530 is configured to store instructions (e.g., computer-executable code) that when executed by the one or more processors 1520, cause the one or more processors 1520 to perform the operations 1300 described with respect to FIG. 13, or any aspect related to it. Note that reference to a processor of communications device 1500 performing a function may include one or more processors of communications device 1500 performing that function.

In the depicted example, the computer-readable medium/memory 1530 stores code (e.g., executable instructions) for transmitting 1531 comprising code for transmitting DCI scheduling multiple transmissions belonging to a plurality of sub-groups where each sub-group comprises one or more transmissions and where the DCI indicates at least one feedback timing, code for transmitting 1533 comprising code for transmitting the multiple transmissions belonging to the plurality of sub-groups, and code for receiving 1535 comprising code for receiving feedback for each sub-group of the one or more transmissions, in accordance with the at least one feedback timing. Processing of the code 1531-1535 may cause the communications device 1500 to perform the operations 1300 described with respect to FIG. 13, or any aspect related to it.

The one or more processors 1520 include circuitry configured to implement (e.g., execute) the code stored in the computer-readable medium/memory 1530, including circuitry for transmitting 1521 comprising circuitry for transmitting DCI scheduling multiple transmissions belonging to a plurality of sub-groups where each sub-group comprises one or more transmissions and where the DCI indicates at least one feedback timing, circuitry for transmitting 1523 comprising circuitry for transmitting the multiple transmissions belonging to the plurality of sub-groups, and circuitry for receiving 1525 comprising circuitry for receiving feedback for each sub-group of the one or more transmissions, in accordance with the at least one feedback timing.

Processing with circuitry 1521-1525 may cause the communications device 1500 to perform the operations 1300 as described with respect to FIG. 13, or any aspect related to it.

Various components of the communications device 1500 may provide means for performing the operations 1300 as described with respect to FIG. 13, or any aspect related to it. Means for transmitting, sending or outputting for transmission may include the transceivers 332 and/or antenna(s) 334 of the BS 102 illustrated in FIG. 3 and/or transceiver 1508 and antenna 1510 of the communications device 1500 in FIG. 15. Means for receiving or obtaining may include the transceivers 332 and/or antenna(s) 334 of the BS 102 illustrated in FIG. 3 and/or transceiver 1508 and antenna 1510 of the communications device 1500 in FIG. 15.

Example Clauses

Implementation examples are described in the following numbered clauses:

Clause 1: A method for wireless communications by a user equipment (UE), comprising: receiving downlink control information (DCI) scheduling multiple transmissions belonging to a plurality of sub-groups, wherein each sub-group comprises one or more transmissions, and wherein the DCI indicates at least one feedback timing; receiving the multiple transmissions belonging to the plurality of sub-groups; and transmitting feedback for each sub-group of the one or more transmissions, in accordance with the at least one feedback timing.

Clause 2: The method alone or in combination with the first clause, wherein: the multiple transmissions correspond to multiple physical downlink shared channel (PDSCH) transmissions; the at least one feedback timing corresponds to at least one hybrid automatic repeat request (HARQ) feedback timing; and the feedback corresponds to a HARQ feedback.

Clause 3: The method alone or in combination with the second clause, wherein the DCI indicates at least one physical uplink control channel (PUCCH) resource for the HARQ feedback for each sub-group of the one or more PDSCH transmissions.

Clause 4: The method alone or in combination with the second clause, wherein the at least one HARQ feedback timing indicates a slot offset between a PDSCH transmission of a sub-group of the plurality of sub-groups and a corresponding HARQ feedback occasion for the HARQ feedback for the PDSCH transmission.

Clause 5: The method alone or in combination with the fourth clause, wherein the PDSCH transmission corresponds to a last PDSCH transmission of the sub-group of the plurality of sub-groups.

Clause 6: The method alone or in combination with the third clause, wherein at least one of: the at least one HARQ feedback timing or the at least one PUCCH resource is applied to all of the plurality of sub-groups.

Clause 7: The method alone or in combination with the third clause, wherein: the DCI indicates at least one of: different HARQ feedback timings or PUCCH resources; and the at least one of: the different HARQ feedback timings or the PUCCH resources are applied to different sub-groups of the plurality of sub-groups.

Clause 8: The method alone or in combination with the third clause, wherein the DCI indicates an entry in a table comprising at least one of: HARQ feedback timings or PUCCH resources for different sub-groups of the plurality of sub-groups.

Clause 9: The method alone or in combination with the eighth clause, wherein: a first set of at least one of: HARQ feedback timings or PUCCH resources are applicable for the different sub-groups when the entry has a first value; and a second set of at least one of: HARQ feedback timings or PUCCH resources are applicable for the different sub-groups when the entry has a second value.

Clause 10: The method alone or in combination with the second clause, wherein the DCI indicates: an entry in a first table comprising HARQ feedback timings for different sub-groups of the plurality of sub-groups; and an entry in a second table comprising physical uplink control channel (PUCCH) resources for the different sub-groups of the plurality of sub-groups.

Clause 11: The method alone or in combination with the third clause, further comprising: receiving a configuration configuring at least one rule; and determining at least one of: the at least one HARQ feedback timing or the at least one PUCCH resource based on the at least one rule.

Clause 12: The method alone or in combination with the eleventh clause, wherein the at least one rule indicates at least one of: a number of bits in the HARQ feedback or a number of the one or more PDSCH transmissions in each sub-group.

Clause 13: The method alone or in combination with the second clause, further comprising selecting a physical uplink control channel (PUCCH) resource set for the HARQ feedback for each sub-group of the one or more PDSCH transmissions based on a number of bits in the HARQ feedback.

Clause 14: The method alone or in combination with the thirteenth clause, wherein when a number of PUCCH resources within the PUCCH resource set is more than a threshold, receiving an indication of at least one PUCCH resource within the PUCCH resource set for the HARQ feedback using an equation that is a function of at least one of: a DCI field within the DCI; a number of control channel elements (CCEs) in a control resource set (CORESET); an index of a first CCE for a reception of the DCI; an index of a sub-group of the plurality of sub-groups; a number of the one or more PDSCH transmissions in the sub-group; or the at least one HARQ feedback timing.

Clause 15: The method alone or in combination with the second clause, further comprising receiving a configuration to transmit one HARQ feedback: per DCI or per sub-group of the plurality of sub-groups associated with a same DCI.

Clause 16: The method alone or in combination with the fifteenth clause, wherein: the one HARQ feedback per DCI is applicable when a number of the PDSCH transmissions scheduled by the DCI is less than a threshold; and the one HARQ feedback per sub-group of the plurality of sub-groups is applicable when the number of the PDSCH transmissions is more than the threshold.

Clause 17: The method alone or in combination with the second clause, further comprising receiving a configuration to transmit the HARQ feedback for a first sub-group of the one or more PDSCH transmissions after a start of transmission of a second sub-group of the one or more PDSCH transmissions.

Clause 18: A method for wireless communications by a network entity, comprising: transmitting downlink control information (DCI) scheduling multiple transmissions belonging to a plurality of sub-groups, wherein each sub-group comprises one or more transmissions, and wherein the DCI indicates at least one feedback timing; transmitting the multiple transmissions belonging to the plurality of sub-groups; and receiving feedback for each sub-group of the one or more transmissions, in accordance with the at least one feedback timing.

Clause 19: The method alone or in combination with the eighteenth clause, wherein: the multiple transmissions correspond to multiple physical downlink shared channel (PDSCH) transmissions; the at least one feedback timing corresponds to at least one hybrid automatic repeat request (HARQ) feedback timing; and the feedback corresponds to a HARQ feedback.

Clause 20: The method alone or in combination with the nineteenth clause, wherein the DCI indicates at least one physical uplink control channel (PUCCH) resource for the HARQ feedback for each sub-group of the one or more PDSCH transmissions.

Clause 21: The method alone or in combination with the nineteenth clause, wherein the at least one HARQ feedback timing indicates a slot offset between a PDSCH transmission of a sub-group of the plurality of sub-groups and a corresponding HARQ feedback occasion for the HARQ feedback for the PDSCH transmission.

Clause 22: The method alone or in combination with the twenty first clause, wherein the PDSCH transmission corresponds to a last PDSCH transmission of the sub-group of the plurality of sub-groups.

Clause 23: The method alone or in combination with the twentieth clause, wherein at least one of: the at least one HARQ feedback timing or the at least one PUCCH resource is applied to all of the plurality of sub-groups.

Clause 24: The method alone or in combination with the twentieth clause, wherein: the DCI indicates at least one of: different HARQ feedback timings or PUCCH resources; and the at least one of: the different HARQ feedback timings or the PUCCH resources are applied to different sub-groups of the plurality of sub-groups.

Clause 25: The method alone or in combination with the twentieth clause, wherein the DCI indicates an entry in a table comprising at least one of: HARQ feedback timings or PUCCH resources for different sub-groups of the plurality of sub-groups.

Clause 26: The method alone or in combination with the twenty fifth clause, wherein: a first set of at least one of: HARQ feedback timings or PUCCH resources are applicable for the different sub-groups when the entry has a first value; and a second set of at least one of: HARQ feedback timings or PUCCH resources are applicable for the different sub-groups when the entry has a second value.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE) configured for wireless communications, comprising:
   a memory comprising instructions; and
   one or more processors, individually or collectively, configured to execute the instructions and cause the UE to:
      receive downlink control information (DCI) scheduling multiple transmissions belonging to a plurality of sub-groups, wherein each sub-group comprises one or more transmissions, wherein the DCI indicates feedback timing indicating a slot offset between a last transmission of each sub-group and a feedback occasion for a feedback for the one or more transmissions of each sub-group, and wherein different values of the feedback timing are applicable for different sub-groups;
      receive the multiple transmissions belonging to the plurality of sub-groups; and
      transmit a plurality of feedbacks for the plurality of sub-groups, in accordance with the different values of the feedback timing.

2. The UE of claim 1, wherein:
   the multiple transmissions correspond to multiple physical downlink shared channel (PDSCH) transmissions;
   the at least one feedback timing corresponds to at least one hybrid automatic repeat request (HARQ) feedback timing; and
   at least one of the plurality of feedbacks correspond to a HARQ feedback.

3. The UE of claim 2, wherein the DCI indicates at least one physical uplink control channel (PUCCH) resource for the HARQ feedback for each sub-group of the one or more PDSCH transmissions.

4. The UE of claim 2, wherein the at least one HARQ feedback timing indicates a slot offset between a PDSCH transmission of a sub-group of the plurality of sub-groups and a corresponding HARQ feedback occasion for the HARQ feedback for the PDSCH transmission.

5. The UE of claim 4, wherein the PDSCH transmission corresponds to a last PDSCH transmission of the sub-group of the plurality of sub-groups.

6. The UE of claim 3, wherein at least one of: the at least one HARQ feedback timing or the at least one PUCCH resource is applied to all of the plurality of sub-groups.

7. The UE of claim 3, wherein:
   the DCI indicates at least one of: different HARQ feedback timings or PUCCH resources; and
   the at least one of: the different HARQ feedback timings or the PUCCH resources are applied to different sub-groups of the plurality of sub-groups.

8. The UE of claim 3, wherein the DCI indicates an entry in a table comprising at least one of: HARQ feedback timings or PUCCH resources for different sub-groups of the plurality of sub-groups.

9. The UE of claim 8, wherein:
   a first set of at least one of: HARQ feedback timings or PUCCH resources are applicable for the different sub-groups when the entry has a first value; and a second set of at least one of: HARQ feedback timings or PUCCH resources are applicable for the different sub-groups when the entry has a second value.

10. The UE of claim 2, wherein the DCI indicates:
an entry in a first table comprising HARQ feedback timings for different sub-groups of the plurality of sub-groups; and
an entry in a second table comprising physical uplink control channel (PUCCH) resources for the different sub-groups of the plurality of sub-groups.

11. The UE of claim 3, wherein the one or more processors are further configured to execute the instructions and cause the UE to:
receive a configuration configuring at least one rule; and
determine at least one of: the at least one HARQ feedback timing or the at least one PUCCH resource based on the at least one rule.

12. The UE of claim 11, wherein the at least one rule indicates at least one of: a number of bits in the HARQ feedback or a number of the one or more PDSCH transmissions in each sub-group.

13. The UE of claim 2, wherein the one or more processors are further configured to execute the instructions and cause the UE to: select a physical uplink control channel (PUCCH) resource set for the HARQ feedback for each sub-group of the one or more PDSCH transmissions based on a number of bits in the HARQ feedback.

14. The UE of claim 13, wherein when a number of PUCCH resources within the PUCCH resource set is more than a threshold, receiving an indication of at least one PUCCH resource within the PUCCH resource set for the HARQ feedback using an equation that is a function of at least one of:
a DCI field within the DCI;
a number of control channel elements (CCEs) in a control resource set (CORESET);
an index of a first CCE for a reception of the DCI;
an index of a sub-group of the plurality of sub-groups;
a number of the one or more PDSCH transmissions in the sub-group; or
the at least one HARQ feedback timing.

15. The UE of claim 2, wherein the one or more processors are further configured to execute the instructions and cause the UE to: receive a configuration to transmit one HARQ feedback: per DCI or per sub-group of the plurality of sub-groups associated with a same DCI.

16. The UE of claim 15, wherein:
the one HARQ feedback per DCI is applicable when a number of the PDSCH transmissions scheduled by the DCI is less than a threshold; and
the one HARQ feedback per sub-group of the plurality of sub-groups is applicable when the number of the PDSCH transmissions is more than the threshold.

17. The UE of claim 2, wherein the one or more processors are further configured to execute the instructions and cause the UE to: receive a configuration to transmit the HARQ feedback for a first sub-group of the one or more PDSCH transmissions after a start of transmission of a second sub-group of the one or more PDSCH transmissions.

18. A network entity configured for wireless communications, comprising:
a memory comprising instructions; and
one or more processors, individually or collectively, configured to execute the instructions and cause the network entity to:
transmit downlink control information (DCI) scheduling multiple transmissions belonging to a plurality of sub-groups, wherein each sub-group comprises one or more transmissions, and wherein the DCI indicates feedback timing indicating a slot offset between a last transmission of each sub-group and a feedback occasion for a feedback for the one or more transmissions of each sub-group, and wherein different values of the feedback timing are applicable for different sub-groups;
transmit the multiple transmissions belonging to the plurality of sub-groups; and
receive a plurality of feedbacks for the plurality of sub-groups, in accordance with the different values of the feedback timing.

19. The network entity of claim 18, wherein:
the multiple transmissions correspond to multiple physical downlink shared channel (PDSCH) transmissions;
the at least one feedback timing corresponds to at least one hybrid automatic repeat request (HARQ) feedback timing; and
at least one of the plurality of feedbacks correspond to a HARQ feedback.

20. The network entity of claim 19, wherein the DCI indicates at least one physical uplink control channel (PUCCH) resource for the HARQ feedback for each sub-group of the one or more PDSCH transmissions.

21. The network entity of claim 19, wherein the at least one HARQ feedback timing indicates a slot offset between a PDSCH transmission of a sub-group of the plurality of sub-groups and a corresponding HARQ feedback occasion for the HARQ feedback for the PDSCH transmission.

22. The network entity of claim 21, wherein the PDSCH transmission corresponds to a last PDSCH transmission of the sub-group of the plurality of sub-groups.

23. The network entity of claim 20, wherein at least one of: the at least one HARQ feedback timing or the at least one PUCCH resource is applied to all of the plurality of sub-groups.

24. The network entity of claim 20, wherein:
the DCI indicates at least one of: different HARQ feedback timings or PUCCH resources; and
the at least one of: the different HARQ feedback timings or the PUCCH resources are applied to different sub-groups of the plurality of sub-groups.

25. The network entity of claim 20, wherein the DCI indicates an entry in a table comprising at least one of: HARQ feedback timings or PUCCH resources for different sub-groups of the plurality of sub-groups.

26. The network entity of claim 25, wherein:
a first set of at least one of: HARQ feedback timings or PUCCH resources are applicable for the different sub-groups when the entry has a first value; and
a second set of at least one of: HARQ feedback timings or PUCCH resources are applicable for the different sub-groups when the entry has a second value.

27. A method for wireless communications by a user equipment (UE), comprising:
receiving downlink control information (DCI) scheduling multiple transmissions belonging to a plurality of sub-groups, wherein each sub-group comprises one or more transmissions, and wherein the DCI indicates feedback timing indicating a slot offset between a last transmission of each sub-group and a feedback occasion for a feedback for the one or more transmissions of each sub-group, and wherein different values of the feedback timing are applicable for different sub-groups;
receiving the multiple transmissions belonging to the plurality of sub-groups; and transmitting a plurality of feedbacks for the plurality of sub-groups, in accordance with the different values of the feedback timing.

28. The method of claim 27, wherein:
the multiple transmissions correspond to multiple physical downlink shared channel (PDSCH) transmissions;
the at least one feedback timing corresponds to at least one hybrid automatic repeat request (HARQ) feedback timing; and
at least one of the plurality of feedbacks correspond to a HARQ feedback.

29. A method for wireless communications by a network entity, comprising:
transmitting downlink control information (DCI) scheduling multiple transmissions belonging to a plurality of sub-groups, wherein each sub-group comprises one or more transmissions, and wherein the DCI indicates feedback timing indicating a slot offset between a last transmission of each sub-group and a feedback occasion for a feedback for the one or more transmissions of each sub-group, and wherein different values of the feedback timing are applicable for different sub-groups;
transmitting the multiple transmissions belonging to the plurality of sub-groups; and
receiving a plurality of feedbacks for the plurality of sub-groups, in accordance with the different values of the feedback timing.

30. The method of claim 29, wherein:
the multiple transmissions correspond to multiple physical downlink shared channel (PDSCH) transmissions;
the at least one feedback timing corresponds to at least one hybrid automatic repeat request (HARQ) feedback timing; and
at least one of the plurality of feedbacks correspond to a HARQ feedback.

\* \* \* \* \*